(12) United States Patent
Lin et al.

(10) Patent No.: US 10,049,481 B2
(45) Date of Patent: Aug. 14, 2018

(54) DIRECT MANIPULATION INTERPOLATION AND GHOST WEDGING FOR DISTRIBUTED NODE-BASED INTERACTIVE WORKFLOWS

(71) Applicant: Disney Enterprises, Inc., Burbank, CA (US)

(72) Inventors: Chung-An Lin, Cerritos, CA (US); Gene Lee, La Canada, CA (US); Christian Eisenacher, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 15/263,218

(22) Filed: Sep. 12, 2016

(65) Prior Publication Data
US 2018/0075639 A1 Mar. 15, 2018

(51) Int. Cl.
| | |
|---|---|
| *G06T 13/20* | (2011.01) |
| *G06T 11/20* | (2006.01) |
| *G06T 17/20* | (2006.01) |
| *G06T 1/60* | (2006.01) |
| *G06F 3/0484* | (2013.01) |

(52) U.S. Cl.
CPC ............... *G06T 13/20* (2013.01); *G06T 1/60* (2013.01); *G06T 11/206* (2013.01); *G06T 17/20* (2013.01); *G06F 3/04845* (2013.01); *G06T 2207/20044* (2013.01)

(58) Field of Classification Search
None
See application file for complete search history.

(56) References Cited

U.S. PATENT DOCUMENTS

2014/0108485 A1 4/2014 Geibel et al.

OTHER PUBLICATIONS

Maya, "Match Poses and Align Clips" https://knowledge.autodesk.com/support/maya/learn-explore/caas/CloudHelp/cloudhelp/2016/ENU/Maya/files/GUID-B2EC65A5-F198-42D6-BAF4-C2C071AC6F5B-htm. html, May 10, 2016.*
Red9, "Red9 MetaData—Develop Conference 2014—MetaData in a Maya Production Pipeline Video 3," https://vimeo.com/102463373, 2014.*
Huang et al., "Interactive Shape Interpolation through Controllable Dynamic Deformation," IEEE, 2011.*
Lin et al., Achieving Real-Time Playback with Production Rigs, SIGGRAPH '15 ACM SIGGRAPH 2015 Talks, 2015, p. 1, Article No. 11, New York, NY.

(Continued)

*Primary Examiner* — Nicholas R Wilson
(74) *Attorney, Agent, or Firm* — Sheppard Mullin Richter & Hampton LLP

(57) ABSTRACT

A distributed computation system is leveraged to evaluate many possible results of a rig near the current pose to obtain predicted poses. A user locally runs an animation application instance to manipulate an animated object including a rig and shape. Depending on a user's selection or modification of a rig control of the rig, changes to the rig control are predicted. Based on the predicted changes to the rig control, the distributed computation system evaluates the rig to obtain different predicted poses. The predicted poses are made available to an interpolator that blends the results to obtain an interpolated shape. In implementations, the distributed computation system may be used to evaluate predicted poses for animation ghosting.

20 Claims, 11 Drawing Sheets

(56) References Cited

OTHER PUBLICATIONS

Anonymous, InstantClick is a JavaScript library that dramatically speeds up your website, making navigation effectively instant in most cases, http://instantclick.io/, Dec. 25, 2014, pp. 1-3, accessed Oct. 19, 2016.

* cited by examiner

DIRECT MANIPULATION INTERPOLATION AND GHOST WEDGING FOR DISTRIBUTED NODE-BASED INTERACTIVE WORKFLOWS

TECHNICAL FIELD

The present disclosure relates generally to techniques for animating rigs in computer animation, and more particularly, to systems and methods for dynamically predicting poses of a rig during direct manipulation of the rig.

BACKGROUND

Skeletal animation is a computer animation technique that represents an object in two primary parts: 1) a mesh that is a surface representation of the object, and 2) a set of interconnected joints (i.e., a rig) used to animate the mesh. Generally, a joint may refer to a bone and the pivot about which it rotates, or a joint may just refer to a pivot. Joints may be related in a hierarchy by joint transformations. Skeletal animation may be applied to transform any object that implements this mesh and rig structure. For example, it may be applied to a whole or a part (e.g., arm, leg, hand, foot, torso) of an animated character, creature, or similar object. Alternatively, it may be applied to animations of other objects, such as clothing, a door, a fork, etc.

During animation, a rig may be represented as a set of nodes of a node graph (e.g., a directed acyclic graph), each node having corresponding input and output attributes. The attributes of a node describe its data, with each node type having a different set of attributes. For example, the nodes associated with an animating sphere may comprise attributes such as radius, angular momentum, position, color, and transparency. During animation of a rig, all or a subset of the rig's nodes are evaluated as data flows. The processed node graph data is visually rendered as a static image or animated scene on a display via a viewport.

Animation rigs used in film productions have become very complex. In many cases, these rigs comprise tens of thousands of nodes, each node being associated with many input attributes and/or computationally expensive operations. Such rigs can generate very appealing shape deformation on computer-generated imagery (CGI) characters. However, rig performance (i.e., speed) suffers when the complexity of the rig increases.

BRIEF SUMMARY OF THE DISCLOSURE

A distributed computation system is leveraged to evaluate many possible results of a rig near the current pose to obtain predicted poses. The predicted poses are made available to an interpolator that blends the results to obtain an interpolated shape. As pose interpolation is significantly less computationally expensive than rig evaluation, embodiments of the systems and methods disclosed herein may achieve significant improvements in throughput and efficiency during animation processes.

In a first embodiment of the disclosed technology, a computing device running a node graph application instance may interpolate predicted poses. The computing device may initiate a node graph application instance, the node graph application instance displaying an object comprising a rig and a shape. As an animator manipulates the object, the animator may select or modify a control of the rig. In response to a control of the rig being selected or modified, a request may be initiated at the computing device for a prediction module to spawn a set of predictions for poses of the object, where the prediction module computes predicted poses for the object based on the initial pose and the selected or modified control of the rig. Two or more of the predicted poses are interpolated to obtain an interpolated shape. The interpolated shape may be drawn in a viewport of the node graph application.

In implementations, the interpolated shape is a result that is temporarily displayed in the viewport until a rig corresponding to a current pose of the object is evaluated. In one implementation, the computing device locally predict changes to the rig controls (e.g., predict poses) and requests that a distributed computation system evaluate the rigs of the predicted poses. In an implementation of the first embodiment, the method further includes: interpolating a second set of poses from the predicted poses to obtain a second interpolated shape; and drawing the second interpolated shape in a viewport of the node graph application as a ghost shape of the first interpolated shape.

In a second embodiment of the disclosed technology, a server system may evaluate predicted poses. The server system may initiate a node graph application instance at a server that includes a copy of an object manipulated on a node graph application instance of a host device; and receive a request from the host device to evaluate predicted poses for the object, where the request includes rig control values for each of the predicted poses. In response to receiving the request, the server system may evaluate the rig control values for each of the predicted poses to obtain a shape for each of the predicted poses; and store in a cache the shape for each of the predicted poses, where the host device may access the cache to retrieve the shapes.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As used herein, a "rig control" generally refers to a control for controlling how a node graph evaluates and deforms an animated object. A rig control may be used to define a shape, position, color, texture, or other property of an animated object or a part of an animated object. For example, for an animated character, a rig control may specify a position of a hand, a shoulder rotation, an amount an eye closes, etc. During animation, an animator may manipulate a rig control to interact with an animated object.

A rig control is associated with one or more rig control values. For instance, one rig control can serve as the location, scale, and orientation of a character's hand. A rig control value may assume a wide variety of variable or value types, such as, for example, a floating point variable, an integer variable, a boolean variable, an enumerated variable type, a percentage, a clamped range, etc.

As used herein, a "pose" generally refers to a particular combination or configuration of rig control values corresponding to a rig of an animated object. For example, for an animated character comprising 3000 rig control values, a pose may comprise 3000 values that define an output shape of the character.

As used herein, a "shape" of an animated object refers to a form and characteristic appearance of an animated object. A shape may be represented as a mesh, a nurb, a curve, etc.

Figure 1:
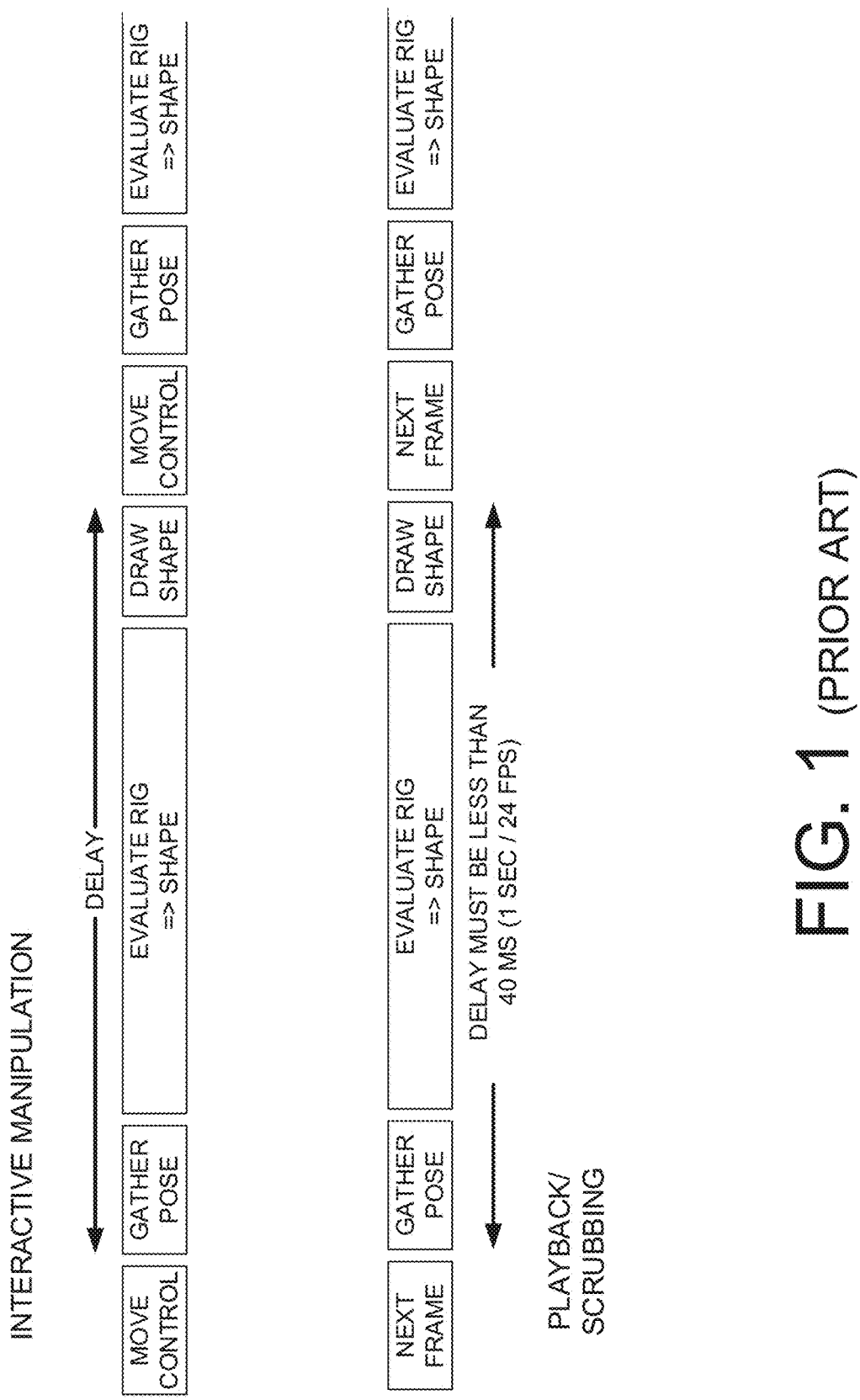
FIG. 1 illustrates conventional processes for evaluating rigs for the purpose of i) interactive manipulation and ii) video playback/scrubbing

As noted above, animation rigs used in film productions have become very complex. This is especially notable when animators manipulate the rig controls to achieve a pose and they have to endure the arduous process of adjusting great numbers of pose controls. This directly affects the quality of films because animators have only limited time to iterate and refine the posing of controls. FIG. 1, which shows conventional processes for evaluating rigs for the purpose of i) interactive manipulation and ii) video playback/scrubbing, illustrates these drawbacks.

During conventional interactive manipulation of a rig, the animator's computer locally evaluates a rig each time the animator moves a rig control or sets a rig control to a new value (e.g., by directly updating input attributes of nodes in a node graph or by manipulating objects in a viewport). The basic feedback loop proceeds as follows: move control→gather pose (i.e., gather current rig control values)→evaluate rig→draw shape. The delay in interaction manipulation is limited to the local computer's ability to process the operations of gathering the pose, evaluating the rig, and drawing the shape. This may lead to choppy interaction with the animated rig.

Similarly, each time a new animation frame is generated during playback or scrubbing of an animation video, the animation process is delayed by the local computer's delay in gathering the pose, evaluating the rig, and drawing the shape. As illustrated by FIG. 1, the majority of the computation time is spent evaluating the rig. If the complexity of the rig is too great (e.g., too many nodes or only a few nodes performing highly complex operations, such as an advanced skinning techniques), the animator's computer may not be able to display the animation video at an acceptable frame rate (e.g., 24 frames per second (FPS)).

Embodiments of the technology disclosed herein address the aforementioned issues by using a distributed computation system to evaluate many possible results of a rig near the current pose to obtain predicted poses. A user locally runs an animation application instance to manipulate an animated object including a rig and shape. Depending on a user's selection or modification of a rig control of the rig, the distributed system predicts changes to the rig control, and based on the predicted changes to the rig control, evaluates the rig to obtain different predicted poses. The predicted poses are made available to an interpolator that blends the results to obtain an interpolated shape.

In implementations, the poses selected for interpolation may be based on a distance or "similarity" between the predicted poses and a current pose. As pose interpolation is significantly less computationally expensive than rig evaluation, embodiments of the systems and methods disclosed herein may achieve significant improvements in throughput and efficiency during animation processes.

In further embodiments of the technology disclosed herein, a distributed computation system may be used to evaluate predicted poses for animation ghosting. Animation ghosting draws shapes from adjacent frames or nearest keyframes of an animated object, in a different shade or opacity, next to the shape of the current frame. This assists an animator with visualizing the animation of an object over time (e.g., visualizing motion).

Embodiments disclosed herein leverage a distributed computation system to predict poses for the current shape and a ghost shape (e.g., a shape corresponding to a previous or subsequent frame). After prediction, the animator's device may interpolate a first set of predicted poses to obtain an interpolated shape for the current frame, interpolate a second set of predicted poses to obtain a ghost shape for an adjacent frame, and subsequently draw the interpolated current shape and the interpolated ghost shape.

Figure 2:
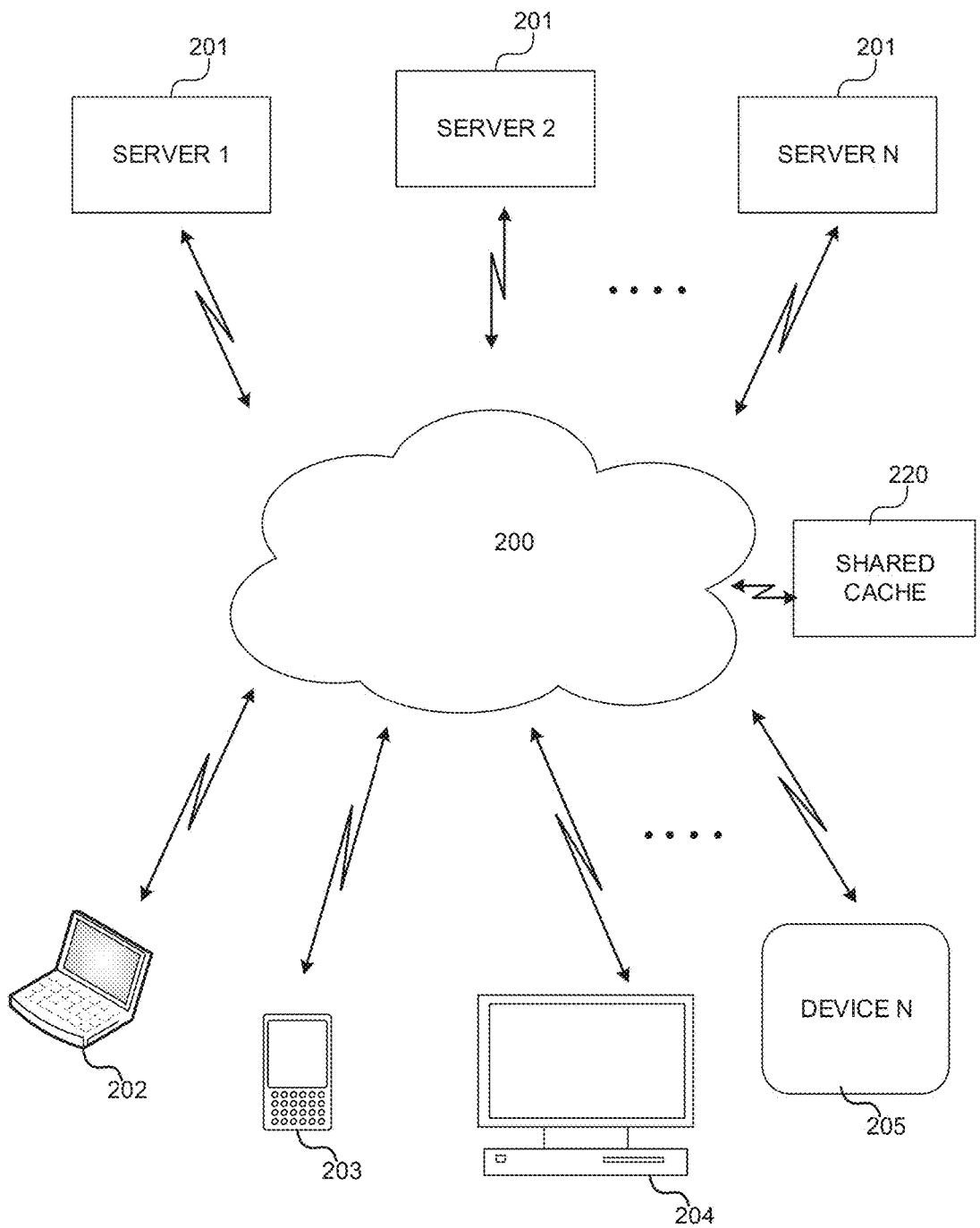
FIG. 2 illustrates one example of a distributed computing system for distributed node-based interactive workflows.

FIG. 2 illustrates one example of a distributed computing system for distributed node-based interactive workflows. The communications system includes a plurality of computing devices 202-205, each communicating with other computing devices 202-205 and servers 201 through communications network 200. Computing devices 202-205 may comprise, but are not limited to, workstation, desktop, laptop, notebook, and tablet computers; hand-held devices such as tablets, smartphones, cellphones, and palmtops; and wearable devices such as head-mounted displays. In communications network 200, the processing of some or all of the rigs (e.g., node based graphical data) generated by users operating computing devices 202-205 is distributed over one or more servers 201. In some embodiments, these servers may be implemented as a grid computer.

As used herein, communications network 200 may refer to any network that allows for a distributed computing system. Communications network 200 may include a cloud computing network, an ad hoc network, an intranet, an extranet, a virtual private network (VPN), a local area network (LAN), a wireless LAN (WLAN), a wide area network (WAN), a portion of the Internet, a cellular telephone network, a satellite network, or any combination thereof. Communications network 200 may use a number of communication mediums. The communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

In various embodiments, further described below, the results of evaluated rigs may be cached in a shared cache 220. For example, given a set of rig controls and values defining a pose, that pose may be associated with a shape determined by evaluating the rig (i.e., by evaluating a node graph). Shared cache 220, in embodiments, may be distributed across multiple hosts (e.g., servers 201 and/or devices 202-205) with the poses of past and future frames. Each host may pre-populate cache 220 with a number of poses. In this manner, relying on cached pose data, a host may process a pose request for a rig or interpolate a set of poses similar to the requested pose during an animation session.

Figure 3:
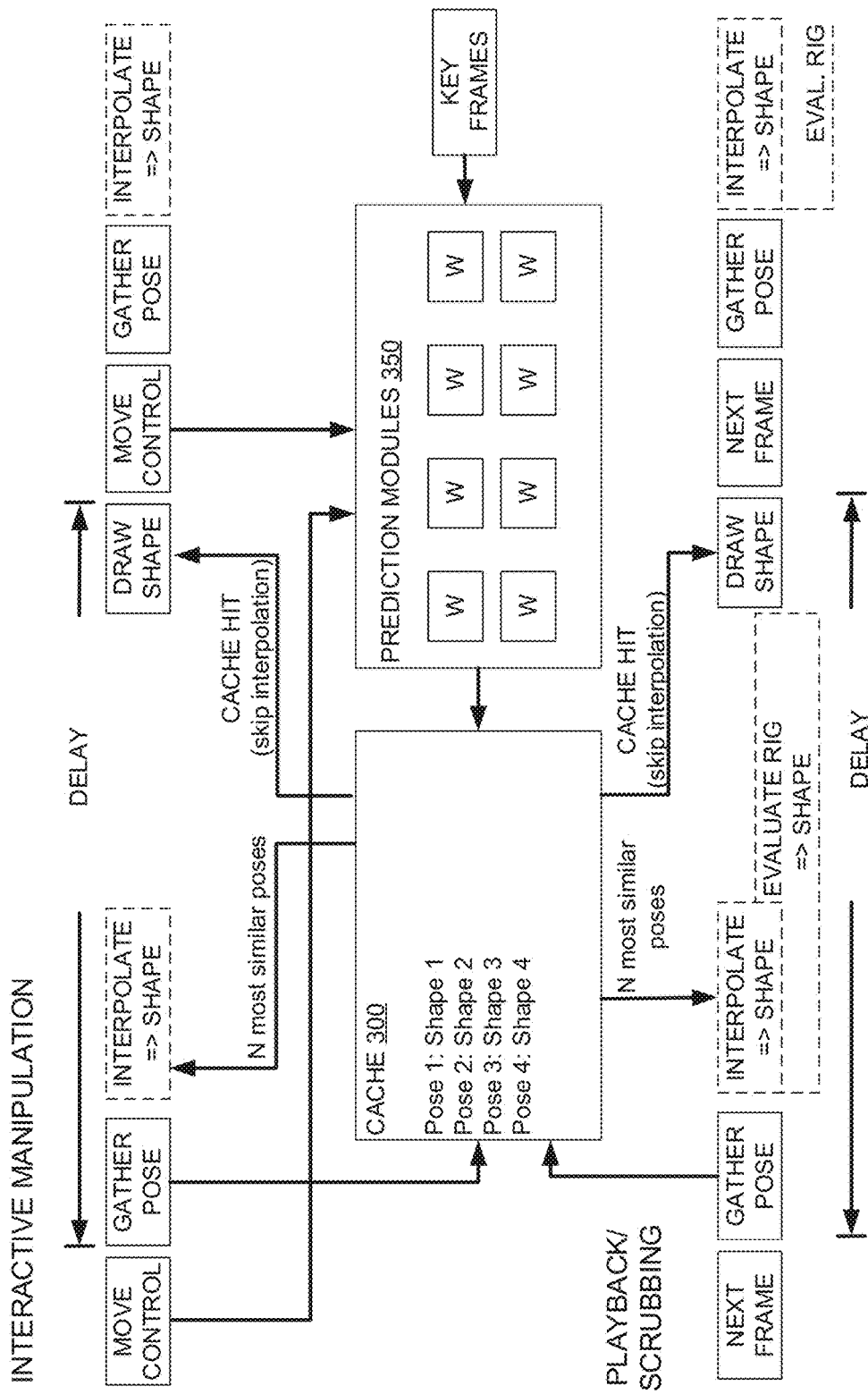
FIG. 3 illustrates an exemplary embodiment of an animation workflow for i) interactive manipulation with a rig and ii) playback/scrubbing of an animated video in accordance with embodiments.

FIG. 3 illustrates an exemplary embodiment of an animation workflow for i) interactive manipulation with a rig and ii) playback/scrubbing of an animated video in accordance with embodiments. In this exemplary workflow, prediction modules 350 may comprise a distributed computing system (e.g., the system of FIG. 2) of workers W, each worker evaluating a whole or subset of a rig on a different machine or process. Prediction modules 350 may also comprise a local or remote prediction management module that predicts a set of poses for evaluation by the distributed computing system. After prediction of a pose and evaluation of the predicted pose's rig to obtain a shape, data of a given pose and associated shape may be stored in cache 300, which, as described above, may be distributed across multiple hosts or otherwise made available to multiple hosts.

During interactive manipulation, illustrated by the top workflow of FIG. 3, an artist may obtain real time interactive feedback as the artist animates objects (e.g., characters) by modifying rig controls (e.g., by manipulating objects in the viewport or by manually inputting rig values). As the artist selects a control to change a value of a rig, prediction modules 350 precompute a set of possible outcomes of the rig (i.e., predicted poses) and stores the results in cache 300.

Once the current pose is computed, the host device may interpolate the predicted poses of a set of N poses most similar to the current pose and draw an interpolated shape (e.g., a mesh). In some cases, the current pose may match one of the predicted poses, interpolation may be skipped, and the shape may be drawn directly from the matching pose stored in cache 300. As illustrated by FIG. 3, the delay in interpolating a pose is significantly less than the delayed in evaluating a rig (e.g., on the order of ten times). Accordingly, significant improvements in throughput and efficiency may be achieved during interaction manipulation.

By way of example, consider the case where an artist is moving an arm of an animated character upward in one dimension. Prediction modules 350 may evaluate the rig for the arm at different heights (e.g., 3, 10, 100 or more) to obtain a set of predicted poses that are stored in cache 300. Thereafter, once the current pose is gathered in the animation application, the predicted poses of the arm may be interpolated to obtain an interpolated shape for the current pose, and the interpolated shape may be drawn in the animation application.

During playback and scrubbing of an animated video, illustrated by the bottom workflow of FIG. 3, prediction modules 350 and cache 300 may similarly be leveraged to cache poses for a given video frame or key frame. In this example implementation, poses are easy to predict from key frames when playing through the video frame range a first time, and repeated (i.e., there is a 100% hit rate in cache 300) when playing through the video frame range. In embodiments, a configurable cache strategy may be applied during a first playback of an animation video. The configurable cache strategy may permit an animator to specify whether to interpolate shapes for every frame (e.g., to speed up a playback framerate and allow playback at speeds greater than the regular speed), evaluate the rig for every frame (e.g., to show an exact representation of the video), or some dynamic combination thereof.

Figure 4:
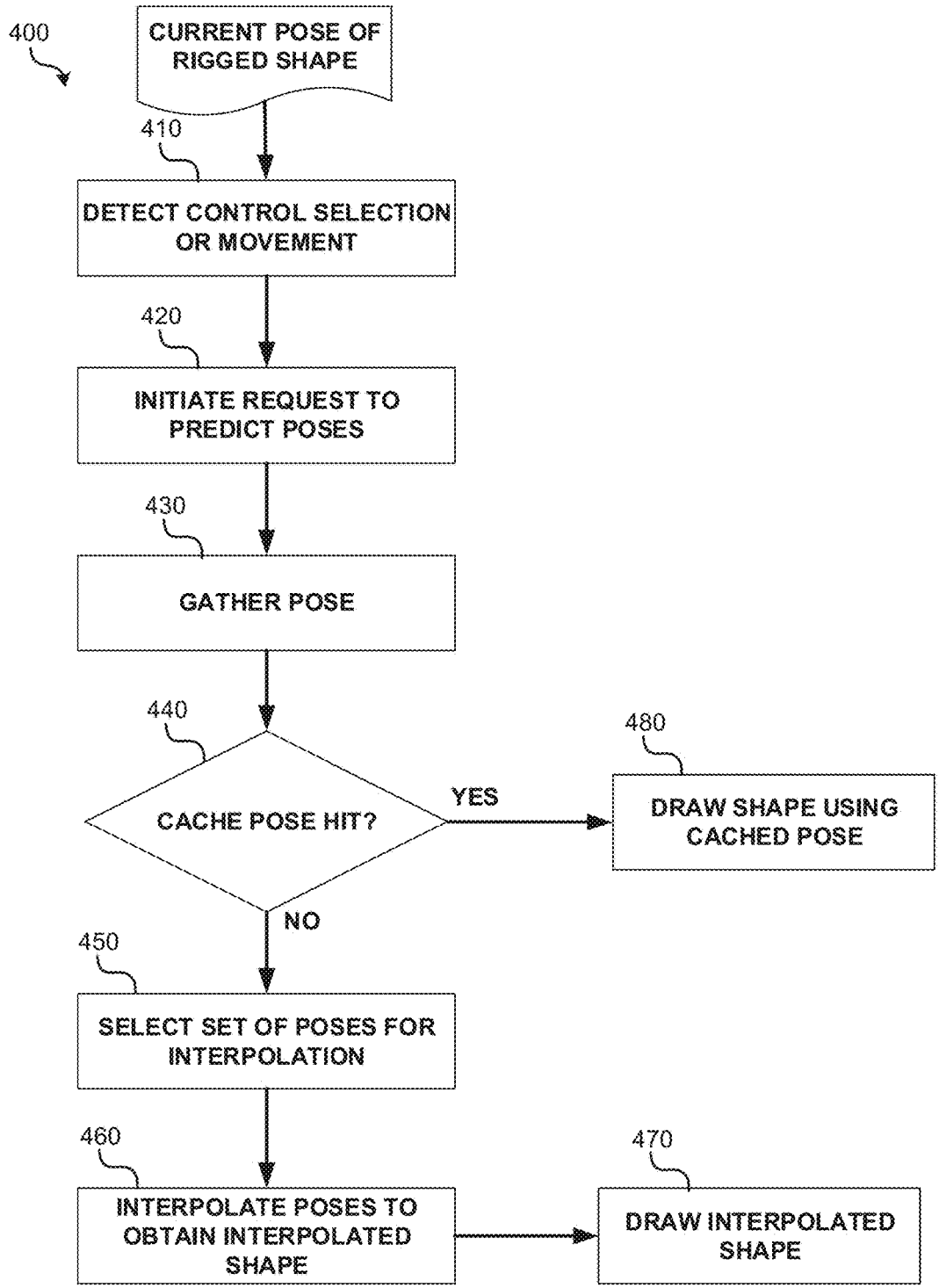
FIG. 4 is an operational flow diagram illustrating an example method that may be implemented by a computing device running an animation application instance to interpolate shapes during direct manipulation of a rig.

FIG. 4 is an operational flow diagram illustrating an example method 400 that may be implemented by a computing device running an animation application instance to interpolate shapes during direct manipulation of a rig. FIG. 4 will be described in conjunction with FIG. 5A, which illustrates a viewport displaying a rigged shape at different steps of method 400.

Figure 5A:
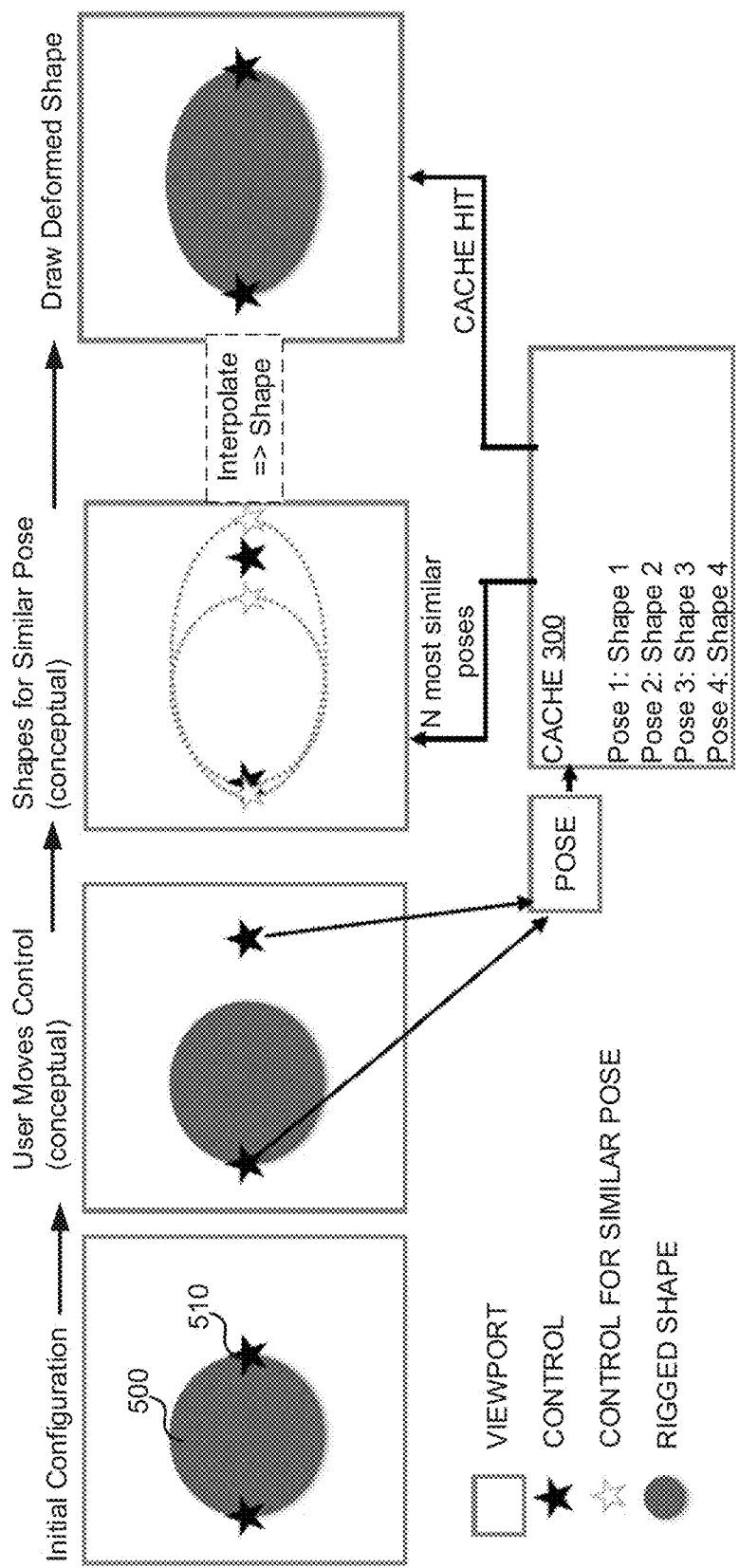
FIG. 5A illustrates a viewport displaying a rigged shape at different steps of the method of FIG. 4.

In embodiments, prior to beginning method 400, a node graph application instance (i.e., an animation application) may be initiated at a computing device. A viewport of the application instance may display a rigged shape (e.g., a rigged mesh selected by the user). For example, as shown in FIG. 5A the initial configuration of the rigged shape 500 is a circular object having controls 510. In some implementations, the step of initiating a node graph application instance may also comprise transmitting an instruction to one or more prediction modules 350 to initiate a node graph application instance comprising a parallel copy of nodes.

At operation 410, selection or movement of a rig control (e.g., rig control 510) is detected. For example, a user may click a rig control in the viewport, click and drag a rig control in the viewport, type a rig control value, or use some other input method to select and/or change a rig control value.

At operation 420, in response to selection or movement of the rig control, the computing device may initiate a request (e.g., through the animation application instance) for one or more prediction modules 350 to spawn a set of pose predictions that represent a plausible posable space given the current pose. In other words, poses are predicted based on predicted changes to the rig control or rig controls selected and/or manipulated by the user.

In one embodiment, prediction modules 350 include a local prediction management module executed by the computing device. In this embodiment, the request initiated by the computing device may include a first request that the local prediction management module predict a set of poses and a second request that one or more servers (e.g., servers 201, workers "W" in FIG. 3) evaluate poses predicted by prediction management module that have not been cached in cache 300. The local prediction management module may be executed asynchronously along with other animation tasks performed by the animation application. It may be a part of the animation application or may be called by the animation application. Alternatively, one or more servers may perform both pose prediction and evaluation of the shapes of the predicted poses.

The request initiated by the computing device may comprise metadata about the current pose, a previous pose, selected/modified rig controls, and other relevant information that permits pose prediction. For example, the metadata may identify the current pose (i.e., all of the current rig control values), a rig control that has been selected, a rate of change of a rig control, a direction of movement of a rig control, etc.

A prediction module 350 may predict changes to the values of the rig controls based on factors such as, for example, user selection, control proximity, statistical analysis, visibility culling, geometric segmentation, or some combination thereof. For example, predictions of the values of the rig controls may be based on a temporal history of user interactions or a directionality of rig control value changes over time. A prediction module 350 may also evaluate the predicted rig control values (i.e., each predicted pose) to compute a shape for each predicted pose. The predicted poses and the computed shapes for the predicted poses may be stored in a cache 300, which as described above, may be distributed and shared by several computing devices including the computing device performing method 400.

In further embodiments, the request may comprise locality metadata that specifies on which modules 350 (e.g., local servers, remote servers, devices on the same LAN, etc.) the pose predictions and/or rig evaluations may occur. In some instances, the computing device may locally perform pose predictions and rig evaluations if local processing bandwidth exceeds a certain threshold.

In embodiments, the request initiated by the computing device may be limited to rig controls that are being modified or are expected to be modified. For example, for a given node graph corresponding to a rig, the request may be limited to nodes that would need to be reevaluated because of current or anticipated changes to the rig controls. By way of example, consider an animator that is manipulating a character rig comprising about 2000 different controls. The animator may select and modify a small subset of those controls. For example, the animator may modify three controls by manipulating a hand of the rig. As the majority of the rig may not be affected by changes to the hand controls, pose prediction may be limited to changes in these three controls. As another example, consider the case where the artist selects but does not modify a rig control in the hand of the character that affects only two nodes in the node graph. In this case, the distributed computation system may predict and evaluate changes only to those two nodes in anticipation of the user modifying the selected rig control.

At operation 430, following changes to rig control values, the current pose of the rig is gathered (i.e., the rig control values of the current pose are gathered). Thereafter, at decision 440 it is determined if the current pose is stored in cache 300, i.e., if there is a cache "hit". For example, if prediction modules 350 exactly predicted the changes to a rig control (and evaluated the rig and stored the pose data) in response to the request to predict poses, then there may be a cache hit. As another example, cache 300 may have been pre-populated (e.g., as part of a previous animation session) with a pose that matches the current pose of the rig. In such cases, where there is a cache hit, interpolation may be skipped and at operation 480 the shape may be drawn on the user's viewport using the cached information.

If at decision 440, it is determined that there is no cache hit, then the shape may be interpolated. At operation 450, a set of poses for shape interpolation may be selected from cache 300. In embodiments, the set of poses may comprise all of the predicted poses calculated and stored in cache 300 by modules 350 or a subset of the predicted poses (e.g., two or more).

In embodiments where a subset of the predicted poses are selected for shape interpolation, the predicted poses may be selected based on factors such as, for example, a predetermined or user-selected number of poses used for interpolation, a similarity between the predicted pose and the current pose (e.g., based on some threshold), a similarity between the average of two or more predicted poses and the current pose (e.g., based on some threshold), and other factors.

Similarity scores between two poses may be determined based on differences between corresponding rig control values between two poses (i.e., the closer the two values, the more similar the two poses). In one implementation, a similarity score between poses may be determined by computing a difference for each respective control value of the two poses and summing the differences (e.g., as a normalized sum). For example, all other control values being equal, a pose having a "left-eye closed" control value of 20% is more similar to a pose with a left-eye closed control value of 25% than a pose with left-eye closed control value of 80%. In another implementation, a similarity score may be determined by computing Euclidean distances between corresponding control values of the two poses and assigning greater weights to larger differences. In other implementations, greater weights may be assigned to differences between currently selected controls or controls that have a greater influence on the object's shape. For example, while an eyelid control for an animated character object would only influence a localized part of the character's shape, a hand location control or foot location control of the animated character may have a much more significant influence on the overall shape.

At operation 460, following determination of a set of poses for shape interpolation, the computed shapes of those poses are interpolated. In one embodiment, the shapes are interpolated based on a weighted average. Shapes associated with poses that are more similar to the current pose may be assigned a higher weight than shapes associated with poses that are less similar to the current pose. For example, the weight for each shape may be proportional to the similarity of its pose and the current pose. Accordingly, poses more similar to the current pose may have a greater influence on the final interpolated shape. In one embodiment, the shapes may be interpolated using radial basis functions. The interpolated shape may then be drawn in the viewport at operation 470.

By way of example, consider the example of FIG. 5A after the user moves a control 510 of rigged shape 500 to the right. In this example, two similar predicted poses are selected: one that predicted the control did not move as far right as it actually did, and a second that predicted that the control moved further right than it actually did. In this case, selection of these two shapes for interpolation yields a close approximation of the actual shape.

In one embodiment, the interpolated shape is a result that is temporarily displayed in the animation application until the rig corresponding to the actual pose (i.e., the current pose) is evaluated. The evaluation of the actual rig may take place on the computing device or a server (e.g., using modules 350). For example, a module 350 may evaluate the rig in response to a request initiated at the computing device. Once the evaluation completes, the actual shape may be drawn and replace the temporary interpolated shape. In implementations, evaluation of the actual rig may take place at any time after a control value is modified and the pose is gathered. For example, evaluation of the rig may take place as a parallel process to interpolation or after interpolation. In one particular implementation, the rig is evaluated only after the animator stops moving and/or selecting the rig controls.

In one implementation, no predicted poses may be suitable for interpolation if the similarity between each predicted pose and the current pose is less than a predetermined or user-preferred threshold, if interpolation between two or more predicted poses will not yield a pose similar to the current pose, or for other reasons. In this implementation, interpolation may be skipped and the animation application instance may instead wait for full evaluation of the shape of the current pose. The computing device may evaluate the shape or the computing device may initiate a request for a server or distributed computation system (e.g., modules 350) to evaluate the shape. For example, consider the case where the current pose for an animated character has the character's hand in front of the character's torso, and all of the predicted poses have the character's hand behind the character's torso. In this case, to avoid an inaccurate representation of the animated character, interpolation may be skipped in favor of fully evaluating the shape.

In yet another implementation, a predicted pose may be so similar to the current pose that using this single pose provides a better result than interpolation with other poses. In this implementation, interpolation may be skipped and the shape of this pose may be drawn.

It should be noted that process 400 may be iteratively repeated to interpolate shapes during direct manipulation of shapes. Additionally, prediction of poses and evaluation of the shapes associated with the predicted poses may occur during various stages of process 400. For example, pose prediction and evaluation of the shapes of the predicted poses may occur in response to control selection, before or after gathering a current pose, and during or after redraw of an interpolated or actual shape.

Figure 5B:
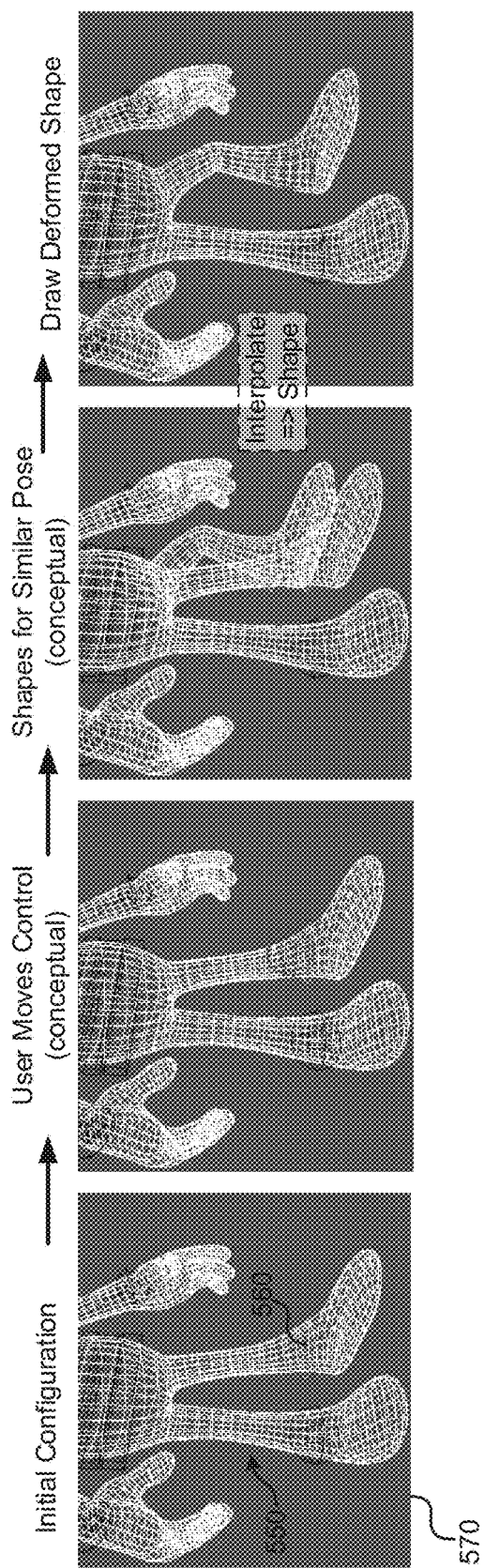
FIG. 5B illustrates a viewport displaying a rigged character at different steps of the method of FIG. 4.

FIG. 5B illustrates another example of a viewport displaying a rigged shape (e.g., a rigged character) at different steps of the method of FIG. 4. In an initial configuration, viewport 570 displays character shape 550 with rig control 560. As illustrated in this example, rig control 560 can serve as the location, scale, and orientation of the character's left leg. As an animator selects and displaces control 560 (e.g., by clicking and dragging the control upward in the viewport), poses are predicted and evaluated for the rigged character. In this example, poses may only be predicted for the subset of the rig that is affected—the character's left leg. For instance, some of the predicted poses may be based on the prediction that the control is modified to move the character's foot backward whereas other predicted poses may be based on the prediction that the control is modified to move the character's foot to the side. The evaluated shapes for some or all of the predicted poses are interpolated and the shape (e.g., the leg) is drawn.

Figure 6:
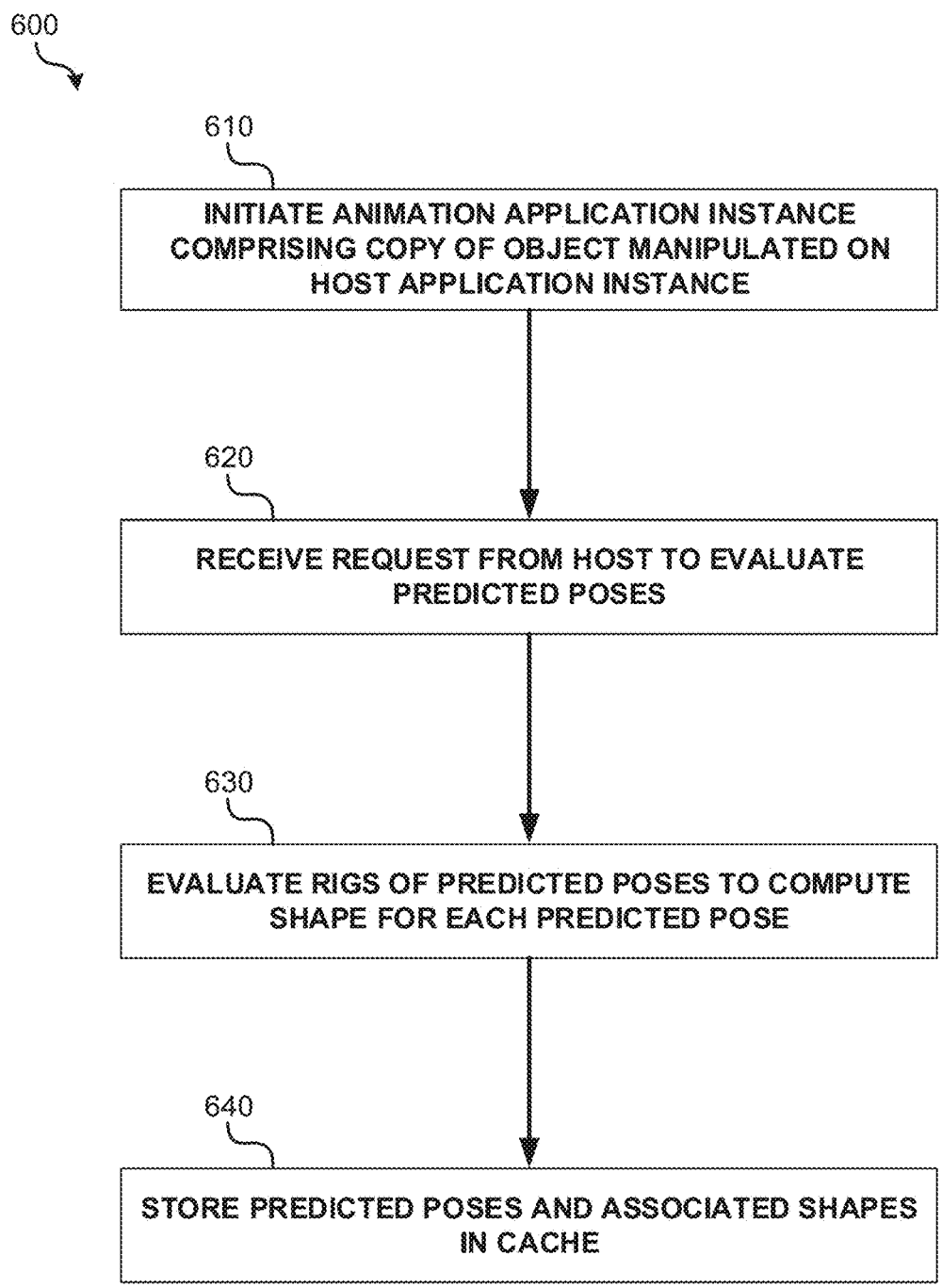
FIG. 6 is an operational flow diagram illustrating an example method that may be performed by a local or remote server of a distributed computation system to predict poses in accordance with embodiments.

FIG. 6 is an operational flow diagram illustrating an example method 600 that may be performed by a local or remote server (e.g. prediction module 350) of a distributed computation system to predict poses in accordance with embodiments. At operation 610, the server initiates an animation application instance comprising a copy of an object (e.g., a rigged shape) manipulated on an animation application running on a host device. For example, the server may initiate a node graph application instance comprising a copy of nodes existing on a host application.

At operation 620, the server receives a request from a host device to evaluate predicted poses for the object being manipulated on the host device. In some embodiments, the request may also request that the server predict poses for the object being manipulated on the host device. The request may comprise metadata about the predicted poses, the current pose, rig controls being selected or modified by the host device, a rate of change of a rig control manipulated on the host device, a direction of a movement of a rig control manipulated on the host device and other relevant information that permits the server to predict or evaluate poses.

The server may predict changes to the values of the rig controls based on factors such as, for example, user selection, control proximity, statistical analysis, visibility culling, geometric segmentation, or some combination thereof. For example, predictions of the values of the rig controls may be based on a temporal history of user interactions or a directionality of rig control value changes over time.

At operation 630, the server evaluates the predicted poses to compute a shape for each predicted pose. At operation 640, the predicted poses and shapes are stored in a cache that is made available to the host device.

Figure 7:
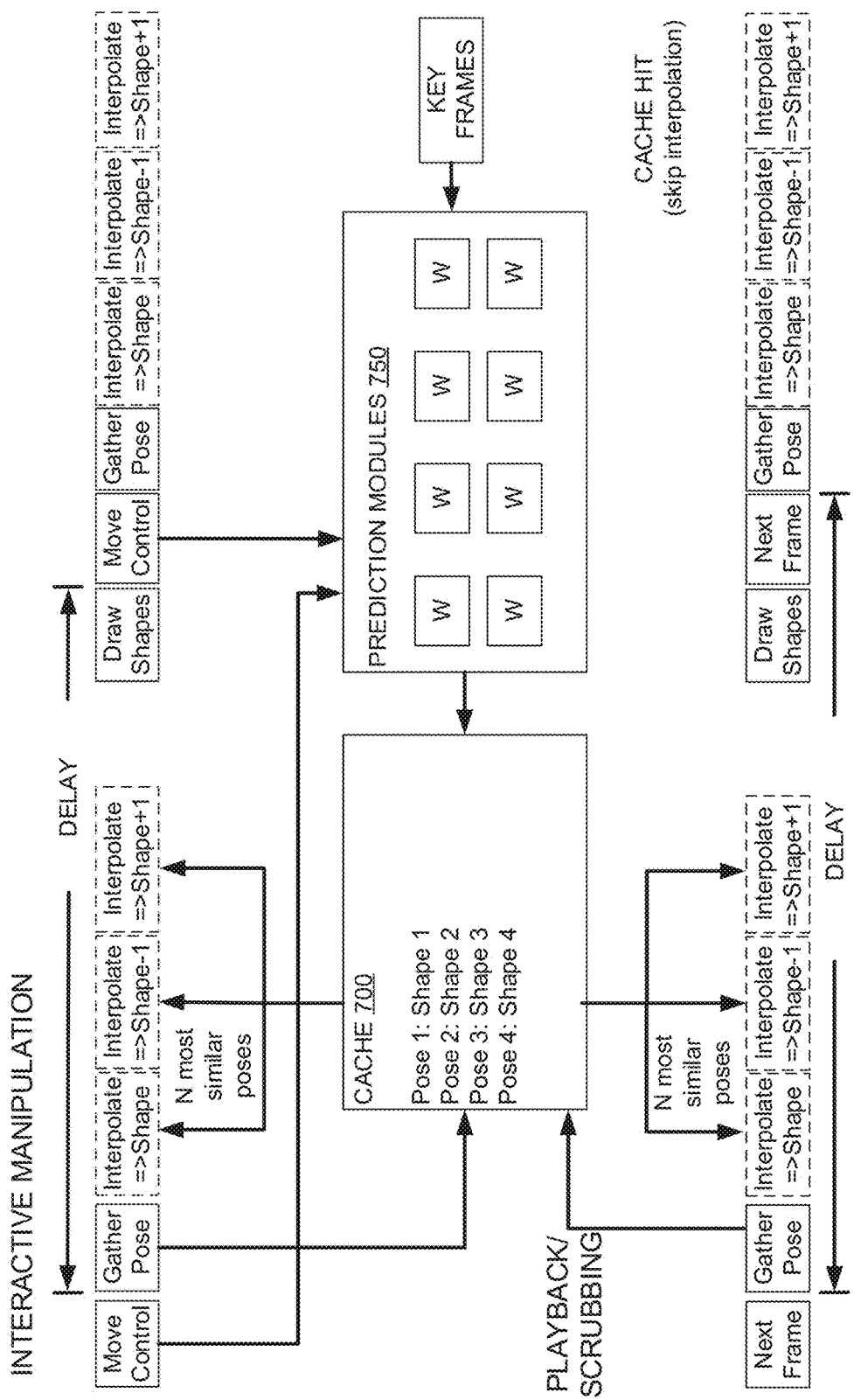
FIG. 7 illustrates an exemplary embodiment of an animation ghosting workflow for i) interactive manipulation with a rig and ii) playback scrubbing of an animated video in accordance with embodiments.

FIG. 7 illustrates an exemplary embodiment of an animation ghosting workflow for i) interactive manipulation with a rig and ii) playback scrubbing of an animated video in accordance with embodiments. FIG. 7 will be described in conjunction with FIG. 8A, which illustrates a viewport displaying a rigged shape at different steps of the animation ghosting workflow for interaction manipulation.

During animation ghosting, shapes for frames adjacent to the current frame (e.g., the previous frame, the next frame, or any set of adjacent frames) are drawn next to the shape for the current frame to assist the animator in visualizing animation of the object over time. The shapes may be drawn with a different shade or opacity. In the embodiment illustrated by FIGS. 7-8, shapes for a previous frame and next frame are drawn adjacent to the shape for the current frame.

Prediction modules 750 may comprise a distributed computing system (e.g., the system of FIG. 2) of workers W, each worker evaluating a whole or subset of a rig on a different machine or process. After evaluation of a rig to obtain a shape, data of a given predicted pose and associated shape may be stored in cache 700, which, may be distributed across multiple hosts or otherwise made available to multiple hosts.

Figure 8A:
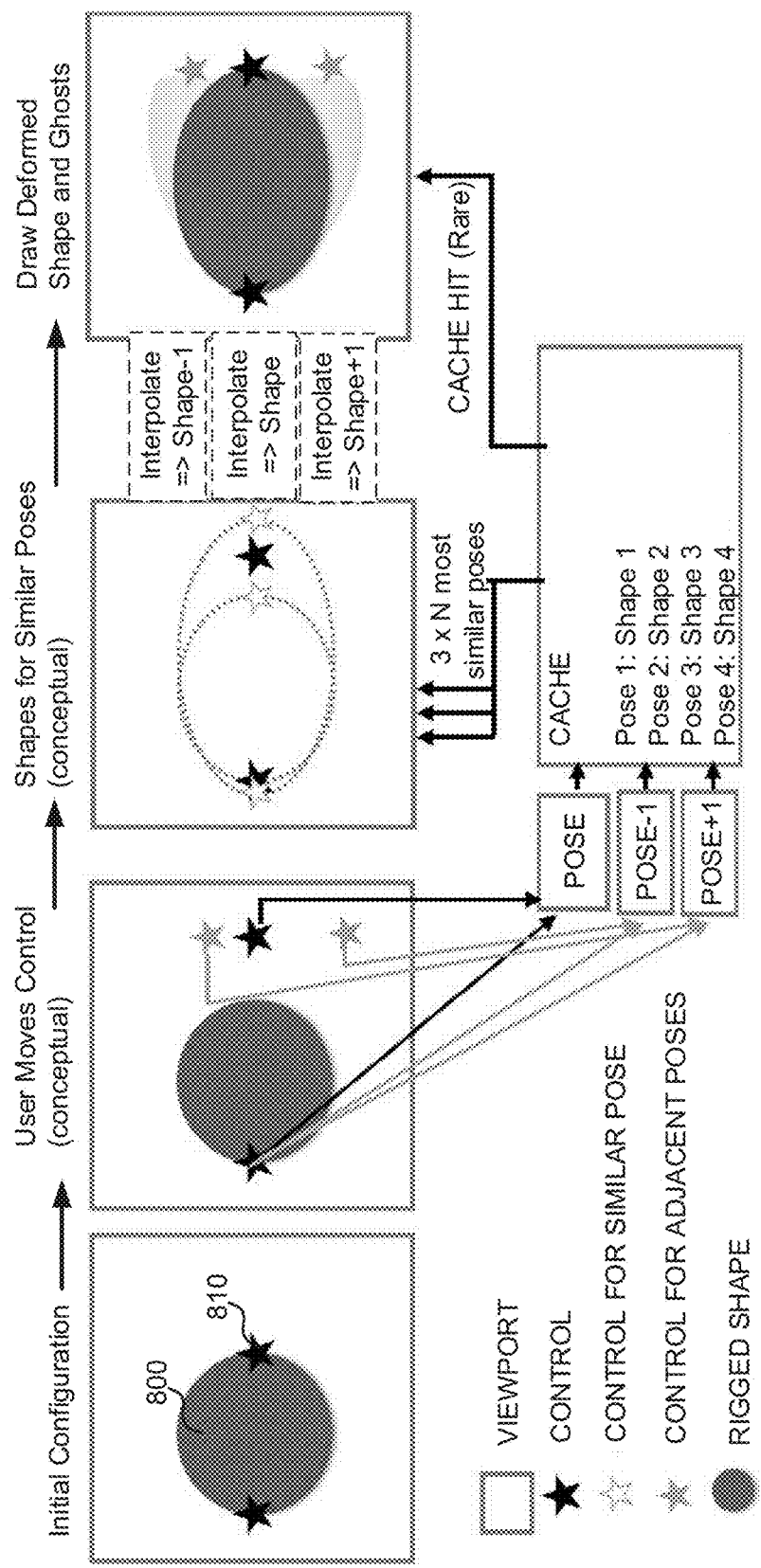
FIG. 8A illustrates a viewport displaying a rigged shape at different stages of the animation ghosting workflow for interaction manipulation of FIG. 7.

During interactive manipulation, illustrated by the top workflow of FIG. 8A, an animator may obtain real time interactive feedback as the artist interacts with a ghosted animated object (i.e., rigged shape 800) by modifying rig controls 810 (e.g., by manipulating the object in the viewport or by manually inputting rig values). As the animator selects a control to change a value of a rig, prediction modules 350 precompute a set of possible outcomes of the rig for the current frame and adjacent frames, and store the results in cache 300. Once the poses for the current and adjacent frames are gathered, the host device may: i) interpolate a first set of poses most similar to the current pose to obtain an interpolated shape for the current frame; and ii) for each of the ghosts, interpolate a second set of poses in frames adjacent to the current pose to obtain interpolated ghost shapes. The host device may then draw the interpolated shape for the current frame and the interpolated ghost shapes as illustrated by FIG. 8A. In some cases, the current pose may match one of the predicted poses, interpolation may be skipped, and the shape may be drawn directly from the matching pose stored in cache 700.

In embodiments, prediction modules 750 may use information from adjacent frames to improve the efficiency of ghost interpolation. For example, instead of predicting ten possible poses for the current frame, six poses may predicted for the current frame, two for the previous frame, and two for the next frame. As another example, existing animation curves may be incorporated to predict how changing a current control will influence the value of that control for adjacent frames.

During playback and scrubbing of an animated video, illustrated by the bottom workflow of FIG. 7, prediction modules 750 and cache 700 may be leveraged to cache poses for a given video frame or key frame.

Figure 8B:
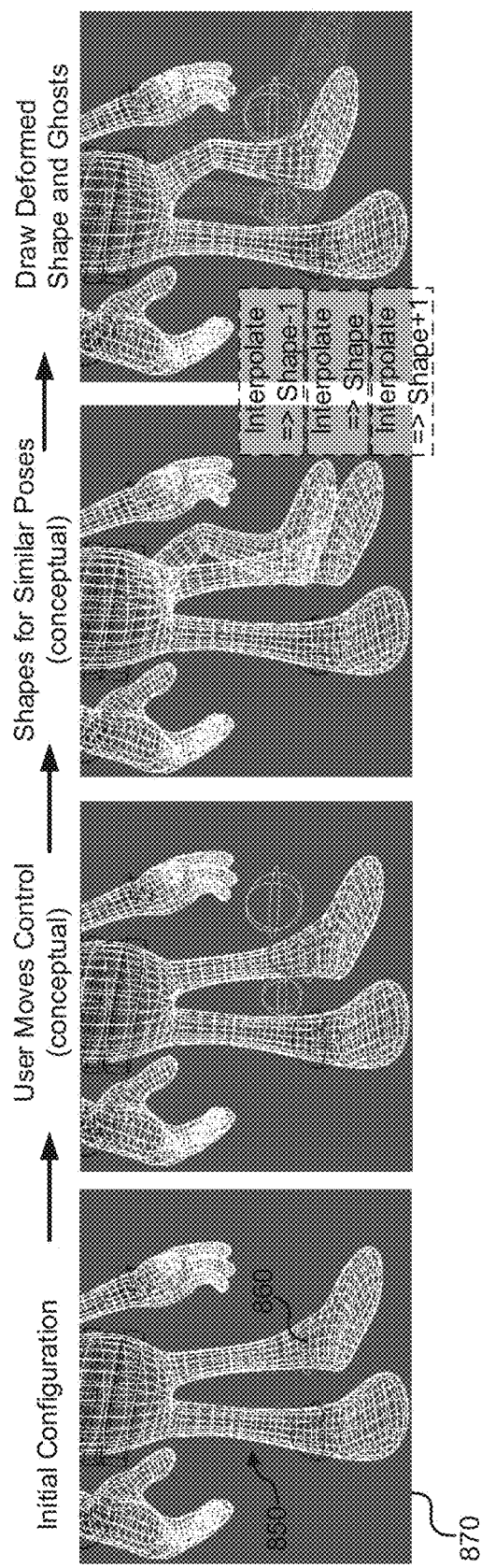
FIG. 8B illustrates a viewport displaying a rigged character at different stages of the animation ghosting workflow for interaction manipulation of FIG. 7.

FIG. 8B illustrates another example of a viewport displaying a rigged shape (e.g., a rigged character) at different stages of the animation ghosting workflow for interaction manipulation of FIG. 7. In an initial configuration, viewport 870 displays character shape 850 with rig control 860 (e.g., a control for the character's left leg). As an animator selects and displaces control 860, poses are predicted and evaluated for the current frame and adjacent frames. A set of poses most similar to the current frame's pose are interpolated to obtain an interpolated shape (e.g., character's leg) for the current frame. For each of the ghosts, a set of poses are interpolated to obtain interpolated ghost shapes (e.g., ghost legs). The interpolated leg for the current frame and the interpolated ghost legs for adjacent frames are drawn.

Figure 9:
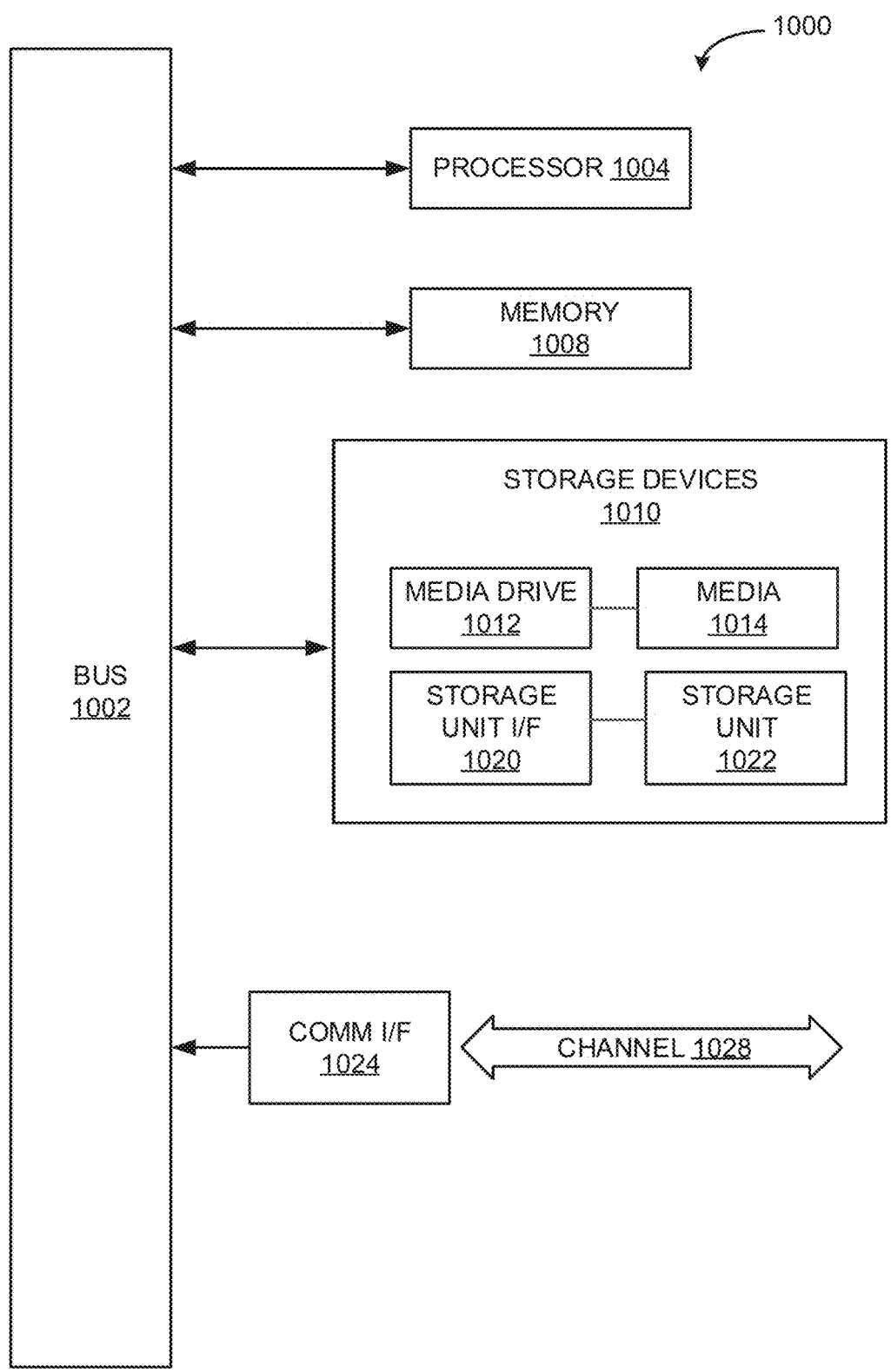
FIG. 9 illustrates an example computing module that may be used to implement various features of the methods disclosed herein.

FIG. 9 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 1000. After reading this description, it will become apparent to a person skilled in the relevant art how to implement the application using other computing modules or architectures.

Referring now to FIG. 9, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   initiating a node graph application instance at a computing device, the node graph application instance displaying an object comprising a rig and a shape;
   receiving data generated by a user selecting or modifying a control of the rig;
   in response to receiving the data, initiating a request at the computing device for a prediction module to spawn a set of predictions for poses of the object given a current pose of the object, wherein the prediction module computes a plurality of predicted poses for the object using at least the current pose and predicted changes to the selected or modified control of the rig; and interpolating two or more of the plurality of predicted poses to obtain an interpolated shape.

2. The method of claim 1, further comprising: drawing the interpolated shape in a viewport of the node graph application.

3. The method of claim 2, wherein the interpolated shape is a result that is temporarily displayed in the viewport until a rig corresponding to the current pose of the object is evaluated.

4. The method of claim 2, wherein the plurality of predicted poses are stored in a cache, wherein the computing device is communicatively coupled to the cache, and wherein interpolating two or more of the plurality of predicted poses comprises: selecting a subset of the plurality of predicted poses stored in the cache for interpolation.

5. The method of claim 4, further comprising:
gathering a pose of the object in response to receiving data generated by the user modifying a control of the rig; and
determining if one of the plurality of predicted poses stored in the cache is the same as the current pose.

6. The method of claim 2, wherein initiating a request at the computing device for a prediction module to spawn a set of predictions for poses of the object, comprises:
the computing device computing a plurality of predicted poses for the object based on at least one of user selection, control proximity, statistical analysis, visibility culling, or geometric segmentation; and
the computing device requesting that one or more servers evaluate each of the plurality of predicted poses.

7. The method of claim 6, wherein the metadata comprises at least one of a rate of change of the rig control or a direction of movement of the rig control.

8. The method of claim 2, wherein the request initiated by the computing device comprises metadata of the selected or modified rig control.

9. The method of claim 2, wherein the prediction module comprises a server system communicatively coupled to the computing device over a network.

10. The method of claim 2, further comprising:
interpolating a second set of poses from the plurality of predicted poses to obtain a second interpolated shape; and
drawing the second interpolated shape in a viewport of the node graph application as a ghost shape of the interpolated shape.

11. A non-transitory computer-readable medium having instructions stored thereon that, when executed by one or more processors, causes a system to:
initiate a node graph application instance, the node graph application instance displaying an object comprising a rig and a shape;
receive data generated by a user selecting or modifying a control of the rig;
in response to receiving the data, initiate a request for a prediction module to spawn a set of predictions for poses of the object given a current pose of the object, wherein the prediction module computes a plurality of predicted poses for the object using at least the current pose and predicted changes to the selected or modified control of the rig; and
interpolate two or more of the plurality of predicted poses to obtain an interpolated shape.

12. The non-transitory computer-readable medium of claim 11, wherein the instructions, when executed by the one or more processors, are further configured to cause the system to draw the interpolated shape in a viewport of the node graph application.

13. The non-transitory computer-readable medium of claim 12, wherein the interpolated shape is a result that is temporarily displayed in the viewport until a rig corresponding to the current pose of the object is evaluated.

14. The non-transitory computer-readable medium of claim 12, wherein the plurality of predicted poses are stored in a cache, wherein the system is communicatively coupled to the cache, and wherein interpolating two or more of the plurality of predicted poses comprises: selecting a subset of the plurality of predicted poses stored in the cache for interpolation.

15. The non-transitory computer-readable medium of claim 14, wherein the instructions, when executed by the one or more processors, are further configured to cause the system to:
gather a pose of the object in response to receiving data generated by the user modifying a control of the rig; and
determine if one of the plurality of predicted poses stored in the cache is the same as the current pose.

16. The non-transitory computer-readable medium of claim 12, wherein initiating a request at the computing device for a prediction module to spawn a set of predictions for poses of the object, comprises:
the system computing a plurality of predicted poses for the object based on at least one of user selection, control proximity, statistical analysis, visibility culling, or geometric segmentation; and
the system requesting that one or more servers evaluate each of the plurality of predicted poses.

17. The non-transitory computer-readable medium of claim 12, wherein the request comprises metadata of the selected or modified rig control.

18. The non-transitory computer-readable medium of claim 17, wherein the metadata comprises at least one of a rate of change of the rig control or a direction of movement of the rig control.

19. The non-transitory computer-readable medium of claim 12, wherein the instructions, when executed by the one or more processors, are further configured to cause the system to:
interpolate a second set of poses from the plurality of predicted poses to obtain a second interpolated shape; and
draw the second interpolated shape in a viewport of the node graph application as a ghost shape of the interpolated shape.

20. A method, comprising:
initiating a node graph application instance at a server, the node graph application instance comprising a copy of an object manipulated on a node graph application instance of a host device, wherein the object comprises a rig and a shape;
receiving a request from the host device to evaluate a set of a plurality of predicted poses for the object, wherein the request comprises rig control values for each of the plurality of predicted poses, wherein each of the plurality of predicted poses were predicted using at least a current pose of the object and predicted changes to a selected or modified control of the rig;
in response to receiving the request, evaluating the rig control values for each of the plurality of predicted poses to obtain a shape for each of the plurality of predicted poses; and storing in a cache the shape for each of the plurality of predicted poses, wherein the host device may access the cache to retrieve the shapes.

* * * * *